United States Patent [19]

Smith et al.

[11] 3,907,155

[45] Sept. 23, 1975

[54] LOCKING FILLER CAP

[75] Inventors: Claude A. Smith, Sandusky; Donald L. Williams, Port Clinton, both of Ohio

[73] Assignee: General Motors Corporation, Detroit, Mich.

[22] Filed: Sept. 3, 1974

[21] Appl. No.: 502,606

[52] U.S. Cl. ............... 220/210; 70/169; 220/209; 220/288; 220/303; 220/326
[51] Int. Cl.² ............... B65D 51/16; B65D 55/14
[58] Field of Search ............ 220/210, 326, 324, 303, 220/288, 203, 302, 209; 70/169; 137/493, 513.5

[56] References Cited
UNITED STATES PATENTS

| | | | |
|---|---|---|---|
| 2,880,604 | 4/1959 | Nehls | 70/169 |
| 2,946,215 | 7/1960 | Eshbaugh et al. | 70/169 |
| 3,179,122 | 4/1965 | Wasdell | 137/493 |
| 3,194,262 | 7/1965 | Hamilton et al. | 137/493 |
| 3,815,776 | 6/1974 | MacMillan | 220/288 |
| 3,820,680 | 6/1974 | Friend | 220/203 |
| 3,858,751 | 1/1975 | Gerdes | 220/210 |

*Primary Examiner*—William I. Price
*Assistant Examiner*—Allan N. Shoap
*Attorney, Agent, or Firm*—C. K. Veenstra

[57] ABSTRACT

In a fuel tank filler cap, a pair of semicircular shell members surround and overlie the upper end of a threaded body member. A torque limiting coupling is provided between the shell members and the body member through a plurality of fingers, formed as part of the body member, which are biased outwardly to engage a serrated circular track formed by the shell members. A pair of latch members are disposed in arcuate guideways also formed by the shell members and are biased to extend under a flange on the fuel tank filler neck, thus preventing unauthorized removal of the filler cap. A cam driven by a lockable member pulls the latch members out from under the filler neck flange to permit removal of the cap.

2 Claims, 2 Drawing Figures

LOCKING FILLER CAP

This invention relates to a filler cap adapted for use on an automobile fuel tank and more particularly to such a filler cap which may be locked against unauthorized removal.

Innumerable constructions have been proposed to permit a fuel tank filler cap to be locked to the fuel tank filler neck to prevent unauthorized removal. However, none of those constructions are suitable for a threaded filler cap having torque limiting provisions. This invention provides a locking threaded filler cap incorporating torque limiting provisions.

In this locking filler cap, a pair of semicircular shell members surround and overlie a threaded body member and provide a serrated circular track which receives a plurality of fingers biased outwardly from the body member, the interengagement of the fingers and the serrated track providing a torque limiting coupling between the shell members and the body member. The shell members also provide a pair of guideways in which latch members are disposed. The latch members are biased to extend under a flange on the fuel tank filler neck and thus prevent unauthorized removal of the cap. A cam driven by a lockable member pulls the latch member out from under the flange to permit removal of the filler cap.

The details as well as other features and advantages of this invention are set forth in the following detailed description and are shown in the drawings in which.

Figure 1:
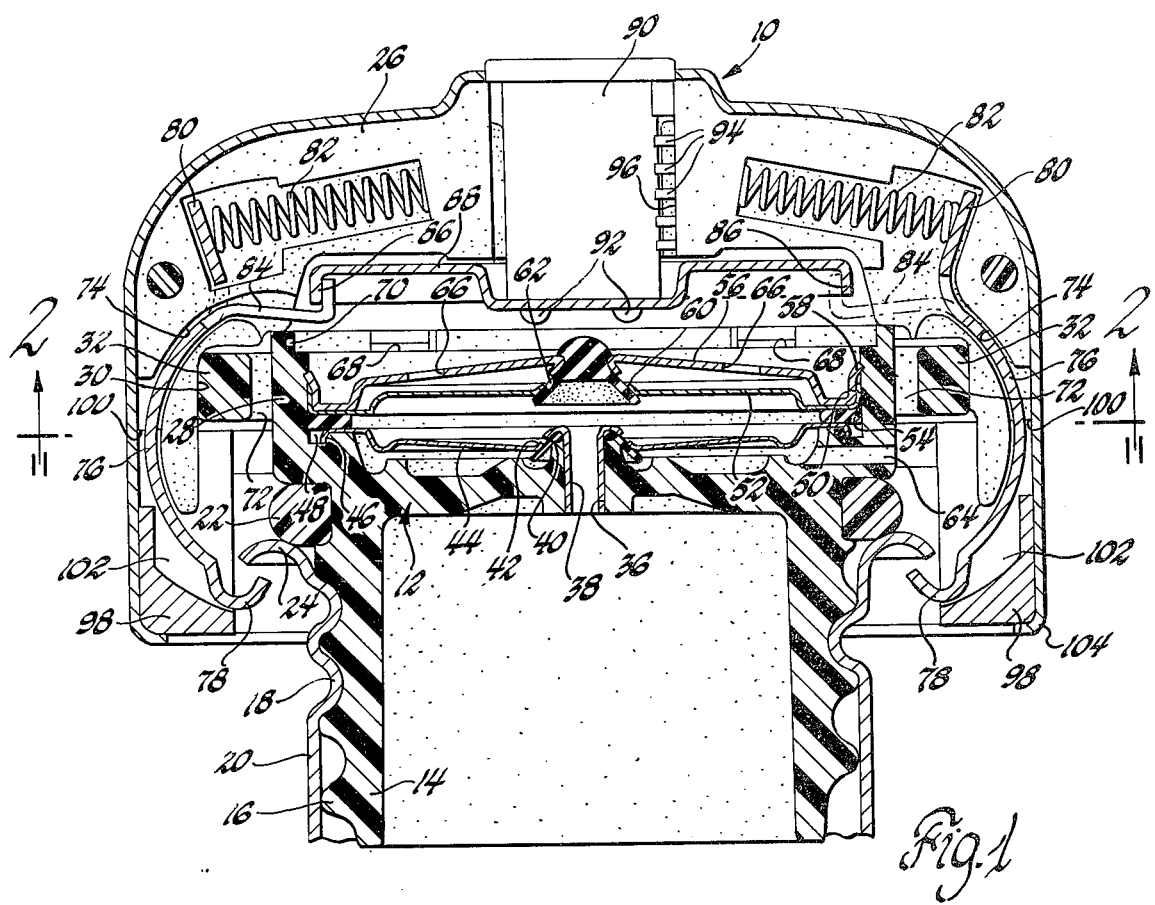
FIG. 1 is a sectional elevational view of this locking filler cap.
Figure 2:
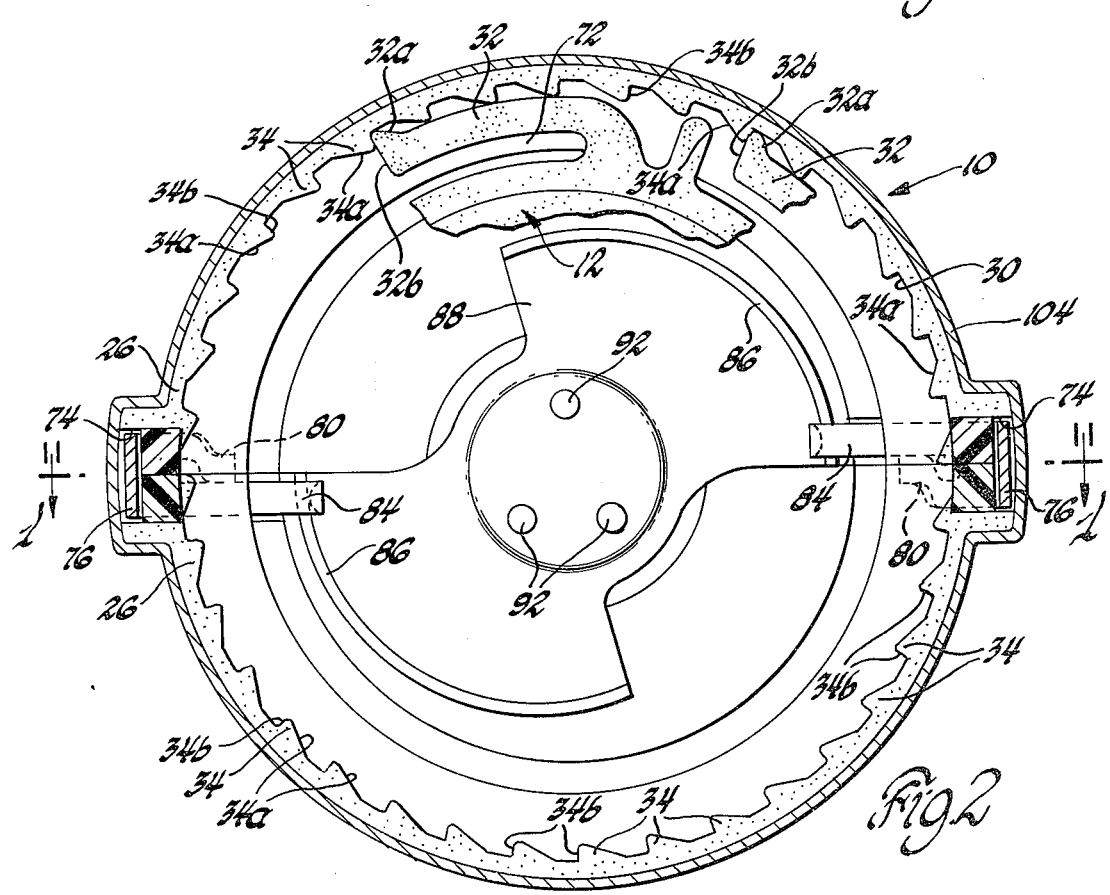
FIG. 2 is a sectional view along line 2-2 of FIG. 1, most of the body member having been broken away to illustrate the latch member operating mechanism.

Referring to the drawings, the filler cap 10 has an acetal resin body member 12 the lower end 14 of which is provided with an outer helical thread 16. Thread 16 mates with an inner helical thread 18 on a fuel tank filler neck 20. Body member 12 carries a surface chlorinated nitrile vinyl rubber seal 22 which engages an outwardly extending flange 24 formed on filler neck 20.

A pair of identical semicircular polyester resin shell members 26 surround and overlie the upper end 28 of body member 12. Shell members 26 define a serrated circular track 30 which receives a plurality of fingers 32 formed as part of and biased outwardly from body member 12. In this particular embodiment, there are six fingers 32 and track 30 has 36 projections 34.

Engagement of fingers 32 with projections 34 provides a torque limiting coupling between shell members 26 and body member 12. When shell members 26 are rotated to apply cap 10 to filler neck 20, the sloped portions 34a of projections 34 engage the sloped portions 32a of fingers 32, thereby transmitting the closing torque to body member 12. As seal 22 engages flange 24 and a selected closing torque is reached, fingers 32 snap over projections 34 to limit the closing torque transmitted from shell members 26 to body member 12. When shell members 26 are rotated to remove cap 10 from filler neck 20, the bluff portions 34b of projections 34 engage the bluff portions 32b of fingers 32, thereby transmitting the opening torque to body member 12.

Body member 12 has a central opening 36 containing an aluminum eyelet 38 which holds a fluorocarbon elastomer seal 40. The inner rim 42 of an aluminum diaphragm 44 engages seal 40, while its outer rim 46 is received in a channel 48 formed in body member 12. The outer rim 50 of another aluminum diaphragm 52 is separated from diaphragm 44 by a nitrile elastomer gasket 54 and is secured by a steel retainer 56 having a toothed outer periphery 58 which digs into body member 12. The inner rim 60 of diaphragm 52 engages a fluorocarbon elastomer seal 62 supported by retainer 56.

With cap 10 secured to fuel tank filler neck 20, the pressure in the fuel tank is sensed through opening 36. Should that pressure drop a selected amount below atmospheric pressure, diaphragm 44 is displaced upwardly from seal 40 and air flows inwardly through a plurality of openings 64 formed in body member 12, upwardly between diaphragm 44 and seal 40, and then downwardly through eyelet 38 to relieve the low pressure condition. Should the fuel tank pressure rise a selected value above atmospheric pressure, diaphragm 52 is displaced upwardly from seal 62 and excess pressure is exhausted upwardly through eyelet 38 between diaphragm 52 and seal 62, through openings 56 formed in retainer 56 and notches 68 provided in an upstanding lip 70 formed on body member 12, and then downwardly through the space 72 between fingers 32 and the upper portion 28 of body member 12.

Shell members 26 define a pair of arcuate guideways 74 which contain a pair of stainless steel latch members 76. The lower ends 78 of latch members 76 extend under the filler neck flange 24. The upper ends of latch members 76 are bifurcated, each having one arm 80 engaged by a spring 82 and another arm 84 received under the contoured rim 86 of a carbon steel cam 88. A lock cylinder 90 is secured to cam 88 by a plurality of headed projections 92 and has a plurality of tumblers 94 received in a slot 96 formed between shell members 26.

It will be appreciated that the interengagement of the ends 78 of latch members 76 with flange 24 will prevent unauthorized removal of cap 10 from the fuel tank filler neck 20. Cap 10 may be removed by inserting a key in lock cylinder 90 to retract tumblers 94, then turning lock cylinder 90 to drive cam 88 in an unlatching direction. The contoured rim 86 of cam 88 pulls latch member arms 84 inwardly against the bias of springs 82 and moves latch member ends 78 out from under filler neck flange 24. Main body 12 then may be withdrawn from filler neck 20 by rotating shell members 26.

Cap 10 is reapplied to filler neck 20 by rotating shell members 26 in the opposite direction until seal 22 engages flange 24 and a selected closing torque is reached. Lock cylinder 90 may then be turned to drive cam 88 in the latching direction whereby its contoured rim 86 will permit latch members 76 to move under the bias of springs 82. Latch member ends 78 then extend under filler neck flange 24 to prevent unauthorized removal of cap 10.

If lock cylinder 90 were turned in the latching direction before cap 10 were applied to filler neck 20, the ends 78 of latch members 76 would engage the upper surface of filler neck 24 when the cap was applied. In this instance, latch members 76 are moved against the bias of springs 82 by the contours of ends 78 and flange 24 until the ends 78 snap over flange 24 and extend thereunder.

A die cast aluminum ring 98 is received under the outer rim 100 of shell members 26 and under fingers 32 to prevent withdrawal of body member 12 from shell members 26. Ring 98 has a pair of channels 102 receiving latch members 76. A finished cover 104 surrounds shell members 26 and ring 98 and is crimped under ring 98 to secure cover 104, shell members 26 and ring 98 in a single unit with body member 12 retained therein.

The embodiments of the invention in which an exclusive property or privilege is claimed are defined as follows:

1. A locking filler cap for use on a fuel tank filler neck having an inner helical thread and an outwardly extending flange, said cap comprising a body member having an outer helical thread about its lower end adapted to mate with said filler neck thread, a seal carried by said body member and adapted to engage said filler neck, a pair of semicircular shell members received about and overlying the upper end of said body member, said shell members defining a circular track having a plurality of projections thereon, said body member having a plurality of fingers biased into engagement with said track, engagement of said fingers and said projections providing a torque limiting coupling between said shell members and said body member whereby said body member may be applied to and removed from said filler neck by rotating said shell members, said shell members defining a pair of guideways, a pair of latch members carried in said guideways, means biasing said latch members to extend under said flange whereby said latch members prevent removal of said cap from said filler pipe, a cam member engaging said latch members and carried between said body member and shell members, and a lockable member connected to said cam member for driving said cam member to thereby pull said latch members out from under said flange whereby said cap may be removed from said filler pipe.

2. A locking filler cap for use on a fuel tank filler neck having an inner helical thread and an outwardly extending flange, said cap comprising a body member having an outer helical thread about its lower end adapted to mate with said filler neck thread, a seal carried by said body member and adapted to engage said filler neck, a pair of semicircular shell members received about and overlying the upper end of said body member, said shell members defining a circular track having a plurality of radially extending projections thereon, said body member having a plurality of fingers biased radially outwardly into engagement with said track, engagement of said fingers and said projections providing a torque limiting coupling between said shell members and said body member whereby said body member may be applied to and removed from said filler neck by rotating said shell members, said shell members defining a pair of vertical arcuate guideways, a pair of arcuate latch members carried in said guideways, means biasing said latch members to extend under said flange whereby said latch members prevent removal of said cap from said filler pipe, a cam member engaging said latch members and carried between said body member and shell members, and a lockable member connected to said cam member for driving said cam member to thereby pull said latch members out from under said flange whereby said cap may be removed from said filler pipe.

* * * * *